MAGNETIC SWITCH FOR READING AND WRITING IN AN NDRO MEMORY

Filed Nov. 20, 1964

INVENTOR
WILLIAM J. BARTIK

BY William E. Cleaver

ATTORNEY

United States Patent Office 3,422,409

Patented Jan. 14, 1969

3,422,409

MAGNETIC SWITCH FOR READING AND WRITING IN AN NDRO MEMORY

William J. Bartik, Jenkintown, Pa., assignor to Sperry Rand Corporation, New York, N.Y., a corporation of Delaware Filed Nov. 20, 1964, Ser. No. 412,800
U.S. Cl. 340—174 7 Claims
Int. Cl. G11b 5/00

ABSTRACT OF THE DISCLOSURE

A magnetic core for each plated wire memory bit line acts as a bidirectional current switch to write information into the plated wire memory and a sensing signal switch detects signals coming from the plated wire memory. These switching cores are grouped according to read-write groups and further grouped according to word groups. Each read-write group is made up of as many cores as there are word groups, being made up of a core from each of the different word groups.

This invention relates to signal switching devices, and, more particularly, to a switching means to be used with a non-destructive read-out memory of a word organized nature.

In a non-destructive read-out memory (hereinafter referred to as an NDRO memory) of a word organized nature, it is very often desirable to make the number of bits in the word very large in order to reduce the number of word drivers and therefore to minimize the cost of the word drivers. For instance, if we consider a memory of 4,000 words wherein each of the words has 32 bits, then such a memory would require 4,000 word drivers and 32 sense amplifiers and 32 bit drivers. It has become the practice that instead of having 4,000 word drivers in such a memory, the memory would be organized such that for the purposes of read-out a memory word would be considered much larger than a machine word or a word handled in a system. For instance, instead of having 4,000 words with 32 bits in such a memory, we might have 1,000 words with 128 bits in each word. If the memory were not an NDRO memory, then we would have to consider employing 128 read amplifiers and 128 bit drivers which would be connected together to form 128 restoration circuits which would restore the information in the memory after it has been destructively read out. If the memory is an NDRO memory it is possible to consider employing less than 128 read amplifiers and 128 bit drivers, sharing these among the 128 bit lines in an appropriate way.

In accordance with the present invention, the number of sense amplifiers, bit drivers, and word drivers is reduced by employing a switching means which enables the memory to share the sense amplifiers and bit drivers. The switching means enables a common set of bit drivers and sense amplifiers to be used for many groups of bit lines and only the group of bit lines that is of particular interest will be selected to be used with the shared component.

Accordingly, it is an object of the present invention to provide an improved read-out system for a memory device.

It is a further object of the present invention to provide an improved memory read-out arrangement for a non-destructive read-out memory of the organized type.

It is yet a further object of the present invention to provide a switching means to be used with a read-out system of a non-destructive read-out memory wherein the switching is a magnetic means.

In accordance with a feature of the present invention, the memory is divided into groups of bit lines, and for each bit line of a group there is provided a magnetic core which acts as a bidirectional current switch when operated to write information into the memory, and as a signal sensing switch when operated to detect small signals resulting from an information read-out.

In accordance with another feature of the present invention, each magnetic core of each group mentioned in the last feature is further grouped with at least one associated magnetic core of another group, and these last-described, grouped, or commonly coupled magnetic cores are connected to a common connected sense amplifier, as well as to a common connected bi-directional current bit driver.

In accordance with another feature of the present invention, each group of bit lines has its respective magnetic cores coupled to a selection wire which has the ability to drive each of the cores in the group to saturation.

In accordance with another feature of the present invention, blocking pulses can be applied to the selection wires of the last-mentioned feature to render ineffective all of the magnetic cores working with the memory with the exception of the group being selected.

In accordance with another feature of the present invention, the word driver pulse is of sufficient length to permit the write current to swing both positive and negative when writing a "zero" bit of information and yet be short enough to permit a reasonable repetition rate. The negative swing allows a reversal of all the cores which have been transferred to their opposite state of remanence after a "one" bit of information has been written.

The above-mentioned and other features and objects of the present invention will become more apparent by reference to the following description taken in conjunction with the accompanying drawings in which.

Figures 1, 2, 3:
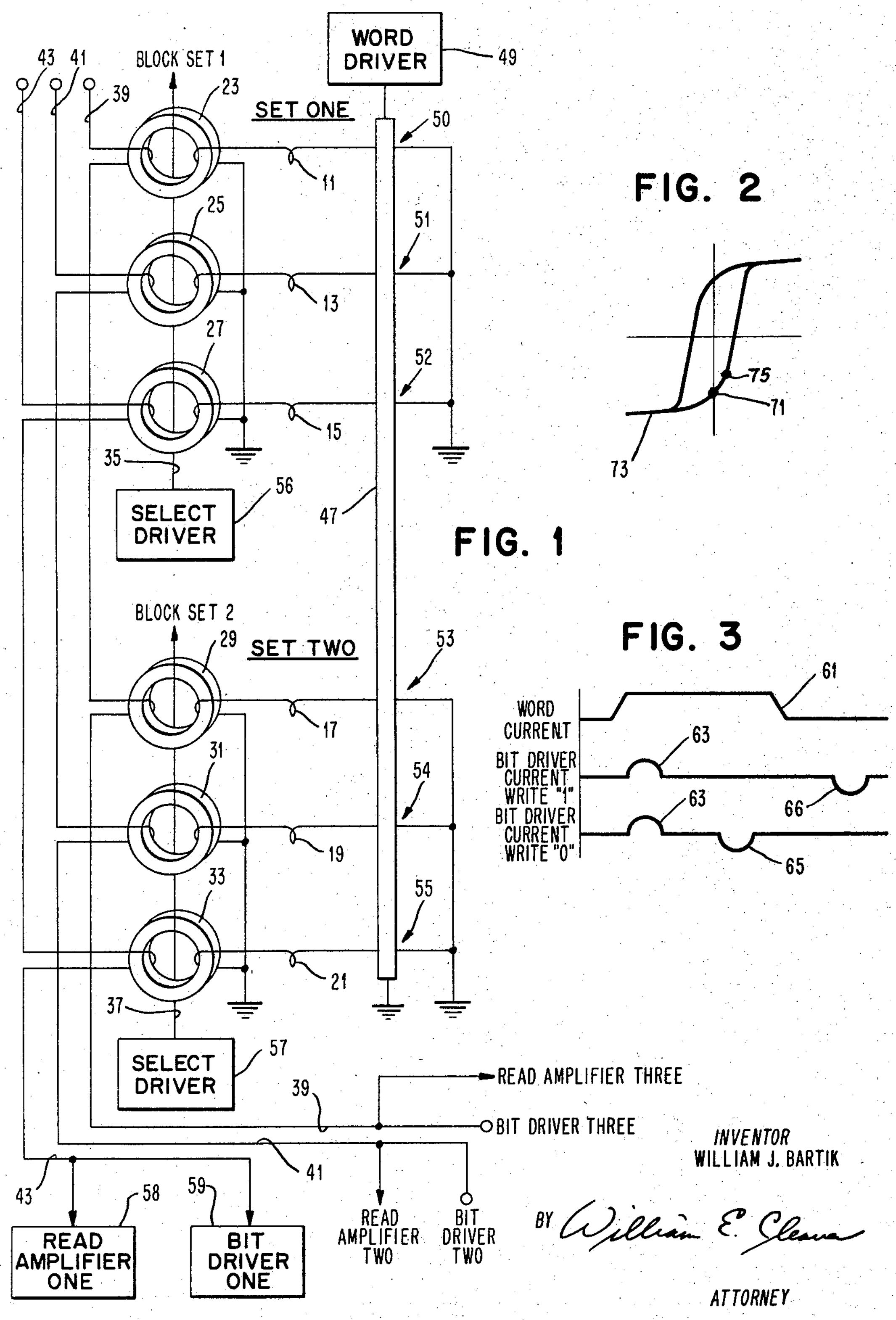
FIGURE 1 shows a schematic of two groups of bit lines and their respective associated switching core arrangements.
FIGURE 2 shows a typical hysteresis loop for the magnetic cores used with the present invention.
FIGURE 3 shows the pulse relationship between a word pulse and the bi-directional current for writing either a "one" or a "zero."

It should be understood that each of the cores in the present invention has a hysteresis loop as shown in FIGURE 2. When such a core is held in the state of saturation the amount of drive current, or the value of H of the hysteresis curve, which is necessary to transfer the core from one state of magnetization to the other, is substantially greater than the amount of drive current necessary to transfer the core from one state of magnetization to the other when the core is held in either one of its remanence states. It is in accordance with this principle that the present invention operates.

Consider FIGURE 1 wherein there is shown a first set of bit lines, plated wires 11, 13 and 15, and a second set of bit lines, plated wires 17, 19 and 21. Although the word drivers are not shown as a group in FIGURE 1, it should be understood that the plated wires would have a plurality of word straps or wires coupled in associated with them, such as word strap 47 which is driven by word driver 49. The word drivers overlying the plated wires provide the magnetic field necessary to move a magnetic vector which normally rests in a circumferential direction around the wire approximately to the 90° angle of the hard axis; i.e., almost directly along the longitudinal axis of the wire. As will be explained later the bit driver current provides a magnetic field necessary to "steer" or move the magnetic vector through the 90° position or away therefrom into the proper orientation to effect the storage of a particular information bit.

Connected to the plated wires 11, 13, and 15 are, respectively, the switching cores 23, 25 and 27, while connected to the plated wires 17, 19 and 21 are, respectively, the switching cores 29, 31 and 33. Threading the switching cores 23, 25 and 27 is a selection wire 35, while threading the switching cores 29, 31 and 33 is a selection wire 37. The cores 23, 25 and 27, along with bit lines 11, 13 and 15, constitute set one; while cores 29, 31 and 33, along with bit lines 17, 19 and 21, constitute set two.

Each of the switching cores, in each of the groups is coupled with a counterpart in each of the other groups, and as is shown in FIGURE 1, the switching core 23 is coupled with the switching core 29, by virtue of the information wire 39. In like manner, the information wire 41, couples the switching core 25 with the switching core 31, and the information wire 43 couples the switching core 27 with the switching core 33.

Consider now the operation of the device shown in FIGURE 1. Assume that we are going to read several bits of information (a word) out of the memory positions 53, 54 and 55 which is defined by the location at which the word strap 47 intersects, or overlies, the plated wires 17, 19, and 21.

In order to selectively read information from memory positions 53, 54, and 55, a read-out from the bit lines of set one must be inhibited. To effect the inhibition the selection wire 35 will be energized to drive the selection cores 23, 25 and 27 to their saturation conditions. Since information is going to be read from plated wires 17, 19, 21, the selection wire 37 will not be energized and hence the selection cores 29, 31 and 33 will be at their respective "zero" remanence states, point 71 in FIG. 2. When a pulse is generated on the word driver strap 47, it moves the magnetic vectors at the positions 53, 54 and 55 towards the "hard" axis and the change in flux produces current signals in the plated wires 17, 19, and 21 which are coupled to the information lines 39, 41, and 43 by cores 29, 31, 33 since there is a finite permeability around the "zero" remanent point 71, coupling the windings on cores 29, 31, 33. In other words, it makes no difference whether there is a "one" or a "zero" stored in the bit position because the current in the plated wires will provide a primary current for transformer action through the cores and since the cores have a finite permeability at point 71 the flux characteristic of each core can be driven either toward the "one" condition or toward the "zero" saturation point 73, depending upon the induced current in its associated plated wire.

While it is true that a signal on the word strap 47 will also move the magnetic vectors at memory positions 50, 51, 52 to induce currents on the plated wires 11, 13, 15, these signals are not coupled to the information lines 39, 41, 43. The foregoing is true because the energization of selection wire 35 has resulted in an operating point on the hysteresis loops of cores 23, 25, 27 at point 73, and hence the permeability of these cores is very nearly zero and little or no signal is induced on the information wires.

FIGURE 2 shows a typical hysteresis curve for the selection cores 23, 25, 27, 28, 31 and 33. It can be noted in FIGURE 2 that the amount of current necessary to drive the selection cores from their remanence state 71 beyond the knee 75 of the curve is less than half the amount of current necessary to drive the cores from their state of saturation 73 beyond the knee 75 of the curve.

Consider now a write-in of information into the memory position 54. In this case, once again the selection driver 35 would be energized to drive selection cores 23, 25 and 27 to their respective saturation states. The bit driver two, which is connected to information line 41, would be energized to switch the core 31 according to the pulse pattern shown in FIGURE 3. In other words, if it were necessary to write a "one" into the position 54, the word driver strap would provide a gating pulse 61, and the information line 41 would provide first a positive pulse 63 and then a negative pulse 66. It will be noted in FIGURE 3 that when a "one" is written, the negative pulse 66 occurs outside of the word pulse 61. The reason for having the negative pulse 66 occur at a time after the word pulse 61 has ceased is in order to drive the selection core 31 back to its "zero" remanence position without disturbing the recorded magnetic pattern at position 54. The write current shown by positive pulse 63, in conjunction with the word pulse 61 will produce flux to move the magnetic vectors at memory position 54 so as to magnetically write a "one" at that position.

Now if it were necessary to write a binary "zero" at position 54 then the bit driver pulses 63 and 65 would occur within the time of the word pulse 61 as shown in FIGURE 3. It will be noted that the negative pulse 65 follows the positive pulse 63 within the time of the word pulse 61 on the bit driver strap 47. The foregoing timing results in orienting the magnetic vectors at position 54 to store or write a magnetic "zero" thereat. At the same time, the negative pulse 65 has restored the switching core to its quiescent state of being in the "zero" remanence state.

The bit driver pulse on information line 41 attempts to switch the selection core 25 in set one which in turn would create an improper information write-in at memory position 51. However, because the selection driver 35 has driven the selection core 25 to its saturation state and because the bit current on line 41 is not sufficient to drive the core 25 from the saturation point beyond the knee of the curve, the selection core 25 is not transferred to its "one" remanence state; and hence there is no current induced upon the plated wire 13.

It should be apparent from the foregoing discussion that many groups of bit lines could be employed with an economy of sense amplifiers, as well as an economy of bit drivers. The length of the memory words can be increased and only a portion of the words would actually be read from the memory by the simple selection of a group of bit lines. The present invention enables an economy of sense amplifiers, bit drivers, and word drivers; and, at the same time, provides a switching means which is magnetic in nature for a further provision of an economy measure.

The embodiments of the invention in which an exclusive property or privilege is claimed are defined as follows:

1. A signal switching device for use with a data processor memory comprising:

(a) a plurality of magnetizable cores, said cores arranged in a plurality of read-write groups, said cores being further arranged in word groups whereby any one core in each of said word groups is assigned to a different one of said read-write groups so that each read-write group is composed of as many cores as there are word groups and is composed of a core from each one of said word groups;

(b) a plurality of selection wires, with each one being respectively assigned to a different one of said word groups and being arranged to couple each of the cores in its assigned word group;

(c) a plurality of bit driver devices with each one respectively assigned to a different one of said read-write groups of cores;

(d) a plurality of read amplifiers with each one respectively assigned to a different one of said read-write groups of cores; and (e) a plurality of information lines with each one assigned to a different one of said read-write groups of cores and coupling all of the cores of its assigned read-write group of cores while being further connected to the bit driver and the read amplifier assigned to its assigned read-write group of cores.

2. A signal switching device for use with a data processor memory comprising:

(a) a plurality of magnetizable cores, said cores arranged in a plurality of read-write groups, said cores further arranged in a plurality of word groups whereby any one core in each of said word groups is assigned to a different one of said read-write groups so that each read-write group is composed of as many cores as there are word groups and is composed of a core from each of said word groups;

(b) each of said magnetizable cores having a hysteresis loop characteristic with first and second remanence states such that there is finite permeability for any of said cores which is in either said first or said second remanence states;

(c) a plurality of selection wires, with each one being respectively assigned to a different one of said word groups and being arranged to couple each of the cores in its assigned word group;

(d) a plurality of bit driver devices with each one respectively assigned to a different one of said read-write groups of cores;

(e) a plurality of read amplifiers with each one respectively assigned to a different one of said read-write groups of cores; and (f) a plurality of information lines with each one assigned to a different one of said read-write groups of cores and coupling all of the cores of its assigned read-write group, each of said information lines being further connected to the bit driver and the read amplifier assigned to its assigned read-write group of cores.

3. A memory device for use with a data processor comprising:

(a) a plurality of magnetizable cores, said cores arranged in a plurality of read-write groups, said cores being further arranged in a plurality of word groups whereby any one core in each of said word groups is assigned to a different one of said read-write groups so that each read-write group is composed of as many cores as there are word groups and is composed of a core from each of said word groups;

(b) a plurality of memory wires wherein each wire is plated with a thin film of magnetizable material for storing data bits, each of said memory wires assigned to a different one of said magnetizable cores and accordingly coupled to its assigned magnetizable core;

(c) a plurality of selection wires, with each one being respectively assigned to a different one of said word groups and being arranged to couple each of the cores in its assigned word group;

(d) a plurality of bit driver devices with each one respectively assigned to a different one of said read-write groups of cores;

(e) a plurality of read amplifiers with each one respectively assigned to a different one of said read-write groups of cores; and (f) a plurality of information lines with one assigned to a different one of said read-write groups of cores and coupling all of the cores of its assigned read-write group of cores and being further connected to the bit driver and the read amplifier assigned to its assigned read-write group of cores.

4. A memory device for use with a data processor comprising in combination:

(a) a plurality of magnetizable cores, said cores arranged in a plurality of read-write groups, said cores being further arranged in a plurality of word groups whereby any one core in each of said word groups is assigned to a different one of said read-write groups so that each read-write group is composed of as many cores as there are word groups and is composed of a different core from each of said word groups;

(b) a plurality of memory wires wherein each memory wire is plated with a thin film of magnetizable material for storing data bits, each of said memory wires being assigned to a different one of said cores and accordingly being coupled to its assigned one of said cores;

(c) each of said cores having a hysteresis loop characteristic with first and second remanence states such that there is finite permeability when any of said cores which is in either said first or said second remanence states;

(d) a plurality of selection wires with each one being respectively assigned to a different one of said word groups and being arranged to couple each of the cores in its assigned word group;

(e) a plurality of bit driver devices with each one respectively assigned to a different one of said read-write groups of cores;

(f) a plurality of read amplifiers with each one respectively assigned to a different one of said read-write groups of cores; and (g) a plurality of information lines with each one assigned to a different one of said read-write groups of cores and coupling all of the cores of its assigned read-write group while being further connected to the bit driver and the read amplifier assigned to its assigned read-write group of cores.

5. A memory device for use with a data processor comprising in combination:

(a) a plurality of magnetizable cores, said cores arranged in a plurality of word groups, said cores being further arranged in a plurality of read-write groups whereby each core in each of said word groups has at least one counterpart core in every other word group;

(b) a plurality of memory wires wherein each memory wire is plated with a thin film of magnetizable material for storing data bits, each of said memory wires being assigned to a different one of said cores and accordingly being coupled to its assigned core;

(c) a plurality of selection wires, with each one being respectively assigned to a different one of said word groups and being arranged to couple each of the cores in its assigned word group;

(d) a plurality of selection drivers with each one being respectively assigned to a different one of said selection wires and accordingly being connected to its assigned selection wire for the purpose of transmitting a signal therealong which signal will drive each of the cores assigned to said last-mentioned selection wire to saturation;

(e) a plurality of bit driver devices with each one respectively assigned to a different one of said read-write groups of cores;

(f) a plurality of read amplifiers with each one respectively assigned to a different one of said read-write groups of cores; and (g) a plurality of information lines with each one assigned to a different one of said read-write groups of cores and coupling all of the cores of its assigned read-write group of cores while being further connected to the bit driver and the read amplifier assigned to its assigned read-write group of cores.

6. A memory device according to claim 5 wherein there is further included a plurality of word driver devices which are disposed to overlay said plurality of memory wires with each word driver defining a plurality of data bit storage positions at each location that it overlays one of said memory wire elements.

7. A memory device according to claim 6 wherein each of said word drivers is capable of generating a relatively long gate signal and wherein each of said bit drivers generates a first and second pulse of opposite phase to one another and for the occasion that a first bit of information is to be written into said memory wires said first pulse occurs within said relatively long gate signal of said word driver and said second pulse occurs at a time that said gate pulse has terminated and whereby on an occasion to write a second bit of information both said first and second pulses from said bit driver occur within said relatively long gate pulse.

References Cited

UNITED STATES PATENTS

| | | | |
|---|---|---|---|
| 3,360,788 | 12/1967 | Casale et al. | 340—174 |
| 3,105,226 | 9/1963 | Bobeck | 340—174 |
| 3,303,481 | 2/1967 | Kessler | 340—174 |
| 3,305,727 | 2/1967 | Matsushita | 307—88 |

BERNARD KONICK, *Primary Examiner.*

P. SPERBER, *Assistant Examiner.*